United States Patent [19]
Pretorius

[11] 3,853,046
[45] Dec. 10, 1974

[54] COOKING DEVICE

[75] Inventor: Hillius Pretorius, Johannesburg, South Africa

[73] Assignee: Super Braai (Proprietary) Limited, Johannesburg, South Africa

[22] Filed: Apr. 23, 1973

[21] Appl. No.: 353,801

[30] Foreign Application Priority Data
Apr. 26, 1972 South Africa...................... 72/2824

[52] U.S. Cl......................... 99/449, 99/380, 99/402
[51] Int. Cl. ............................................. A47j 37/06
[58] Field of Search..................... 99/449, 339–340, 99/349, 393, 399, 402, 421, 425, 435, 445–446, 372, 380, 426–427; 211/85

[56] References Cited
UNITED STATES PATENTS

| | | | |
|---|---|---|---|
| 541,534 | 6/1895 | Haffcke | 99/446 |
| 1,831,442 | 11/1931 | Dorica | 99/402 X |
| 2,501,104 | 3/1950 | Smith | 99/449 |
| 3,182,585 | 5/1965 | Rensch et al. | 99/393 X |
| 3,191,519 | 6/1965 | Kidder | 99/421 HV |
| 3,490,357 | 1/1970 | Lescure | 99/446 X |
| 3,495,524 | 2/1970 | Miles | 99/399 |

*Primary Examiner*—Robert L. Bleutge
*Assistant Examiner*—Arthur O. Henderson
*Attorney, Agent, or Firm*—Karl W. Flocks

[57] ABSTRACT

A method and device for cooking meat, fish, or like foodstuff. The method includes the steps of heating a grill-arrangement of heat-conductive material at laterally spaced heating zones. The meat, fish, or like foodstuff is cooked by locating it in contact with the grill-arrangement intermediate the heating zones. The device comprises a grill-arrangement of heat-conductive material having laterally spaced heating zones, fuel burners adapted to burn a volatile fuel and adapted to supply heat to the heating zones, and a collecting tray located under the grill-arrangement.

Heat supplied at the heating zones is conducted by the grill-arrangement to be available for cooking intermediate the heating zones.

5 Claims, 4 Drawing Figures

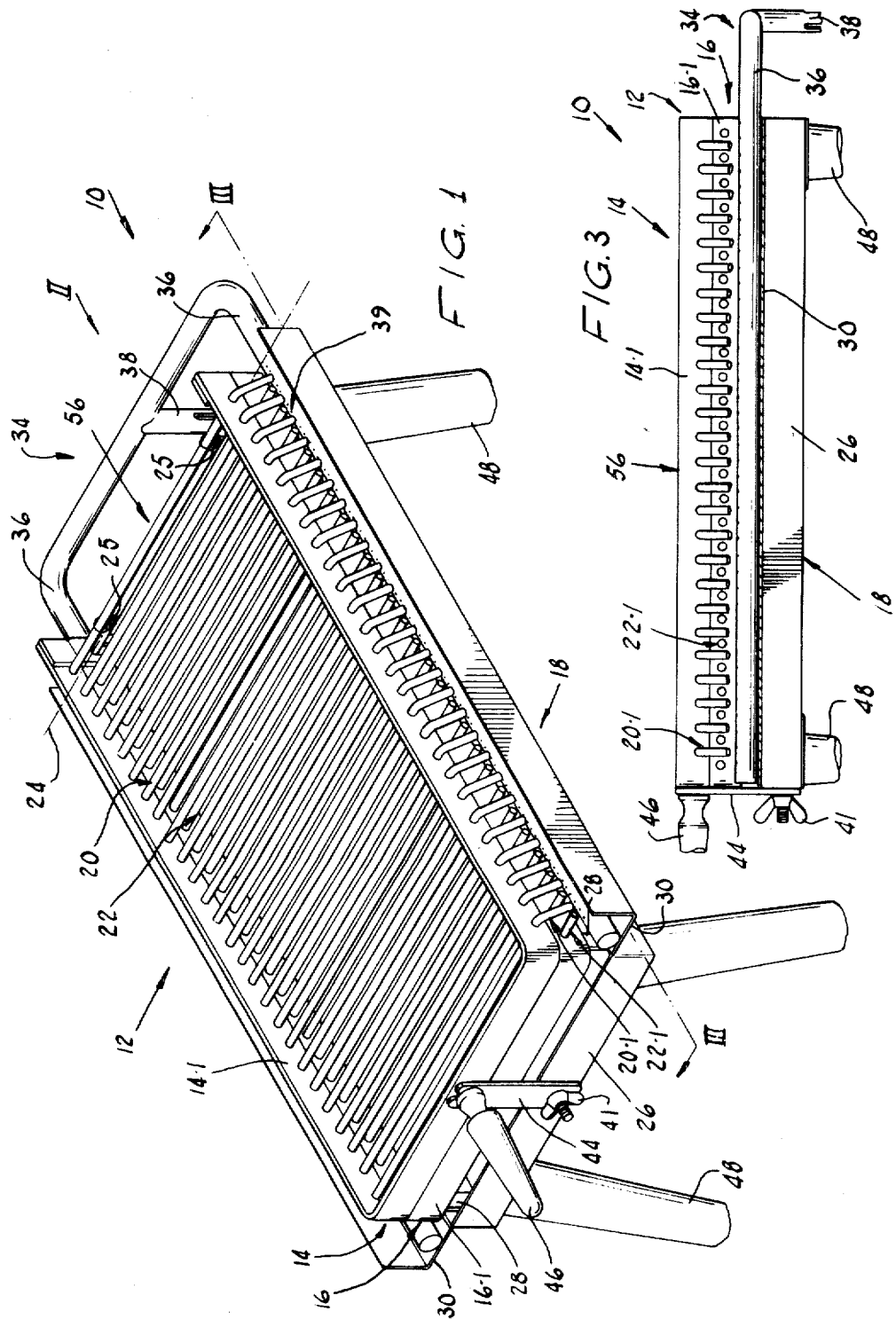

COOKING DEVICE

This invention relates to cooking. It particularly relates to a device suitable for cooking.

According to the invention there is provided a device for cooking meat, fish, or like foodstuff, which includes the steps of heating a grill arrangement of heat conductive material at laterally spaced heating zones; of cooking the meat, fish, or like foodstuff by locating it in contact with the grill arrangement intermediate the heating zones and of providing a collecting tray under the grill arrangement for collecting liquids, juices, or gravy dripping from the meat, fish, or like foodstuff.

The grill arrangement may have an upper and a lower grill member, and the meat, fish, or like foodstuff may be disposed between the said grill members, heat for cooking being applied simultaneously to the upper and lower surfaces of the meat, fish, or like foodstuff.

The heating may be provided by combustion of a volatile fuel. The fuel may be disposed in channels extending below the heating zones.

Further according to the invention there is provided a device for cooking meat, fish, or the like foodstuff, which includes a grill arrangement of heat conductive material having laterally spaced heating zones, fuel burners adapted to burn a volatile fuel and adapted to supply heat to the heating zones, and a collecting tray located under the grill arrangement.

The grill arrangement may comprise an upper and a lower grill member, at least one of said grill members being displaceable relatively to the other for receiving the meat, fish, or like foodstuff between said grill members.

The grill arrangement may be of substantially rectangular form and the upper grill member may be hingedly attached or attachable to the lower grill member about a pivotal axis along one edge of the grill members, the heating zones extending along the opposed edges of the grill member substantially at right angles to the pivotal axis.

The burners may be arranged below the heating zones of the grill arrangement on manifolds extending along the lengths of the heating zones. The manifolds may have connecting means connectible via conduit means to a fuel reservoir remote from the burners. The burners may furthermore be in the form of channels extending below the heating zones, the channels being adapted to hold fuel in liquid form.

The grill arrangement and the tray may be separable from one another. Furthermore, the device may have detachable support legs.

The invention is now described by way of an example with reference to the accompanying drawings in which:

FIG. 1 shows a three-dimensional view of a device for cooking meat, fish, or like foodstuff according to an embodiment of the invention;

FIG. 3 shows a sectional elevation along lines III to III of FIG. 1; and

Figure 4:
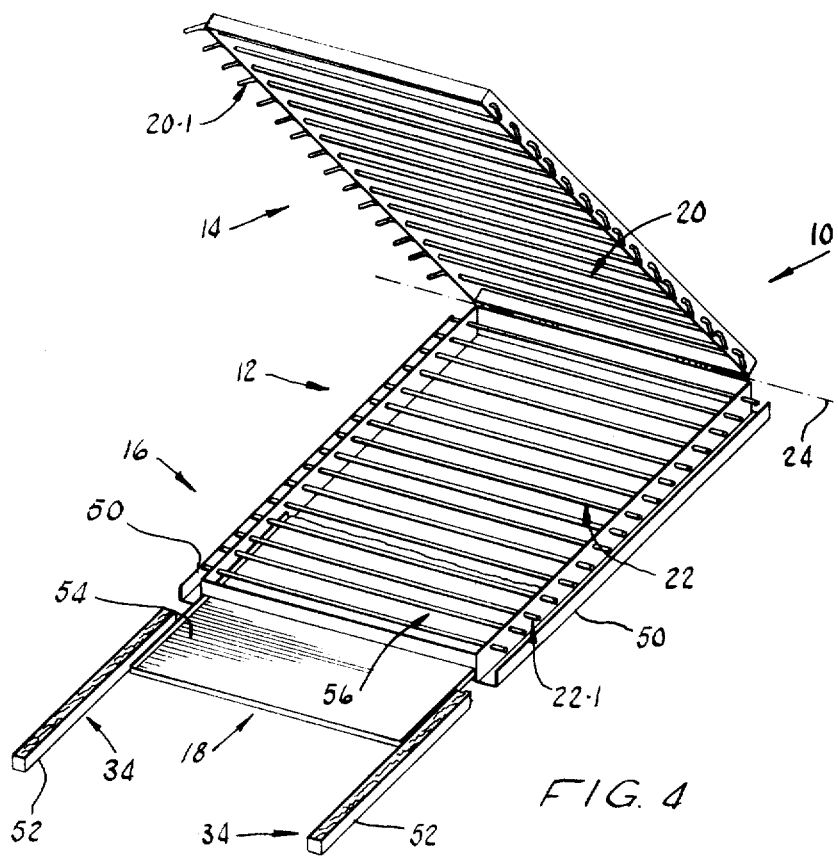
FIG. 4 shows an exploded schematic three-dimensional view of a device for cooking meat, fish, or like foodstuff according to another embodiment of the invention.

Referring to the drawings, a device for cooking meat, fish, or like foodstuff is generally indicated by reference numeral 10.

The device comprises a grill arrangement 12 in the form of an upper and a lower grill member 14 and 16 respectively, a collecting tray 18 located under the grill arrangement, and a fuel burner 34.

The upper grill member 14 is hingedly attached to the lower grill member 16 about a pivotal axis 24.

The upper and lower grill members 14 and 16 each comprises a substantially rectangular frame 14.1 and 16.1 respectively, and transverse heat conductive rods 20 and 22 provided in the frame as shown. The transverse rods extend beyond the frame as shown in the drawings. Laterally spaced heating zones are provided by the extending portions of the rods indicated by reference numerals 20.1 and 22.1 respectively.

As shown in the drawings, the extended portions 20.1 of the rods 20 depend from the frame 14.1 to terminate at a position slightly below the portions 22.1 of the rods 22. This arrangement permits the ends of the portions 20.1 and 22.1 to be at substantially the same height when, for example, meat in the form of a steak is located between the two grill members for cooking. The rods 20 are furthermore staggered in relation to the rods 22 in plan view.

Figure 2:
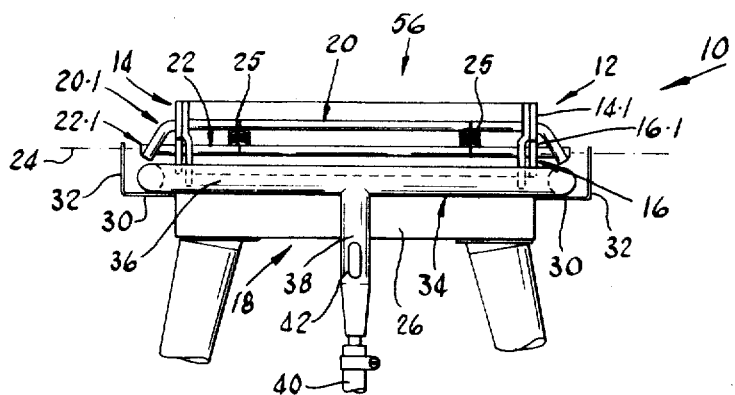
FIG. 2 shows an end view of the device of FIG. 1 in the direction of arrow II of FIG. 1.

Referring to FIGS. 1 to 3, the collecting tray 18 includes a collecting portion 26, for collecting liquids, juices, or gravy which may drip from the meat, fish, or like foodstuff, and which supports the grill arrangement 12 by means of legs 28. Flanges 30 extend from the collecting portion 26 and have an upwardly directed lip 32.

The fuel burner 34 shown in FIGS. 1 to 3, is suitable for combustion of a gaseous fuel and is in the form of a U-shaped manifold pipe 36 having holes 38. The manifold pipe 36 is located on the flanges 30 in a manner for the holes 38 to correspond with and be below the extending portions 20.1 and 22.1 of rods 21 and 22 respectively. The manifold pipe 36 is furthermore provided with a depending section 38 having a nozzle (not shown) and connectible via a conduit 40 to a fuel reservoir (not shown) remote from the burner for supplying gaseous fuel to the burner. Air inlets 42 are provided in the section 38. Three non-aligned air inlets 42 are provided.

A connecting member 44 is at one end attached to the collecting tray by means of a wing nut 41 as shown, the other end being capable of receiving a screw-threaded projection provided on the upper frame 14.1, to permit the upper grill member 14 to be locked in a spaced relationship relative to the lower grill member 16, by means of a handle 46 having a screw-threaded socket.

Detachable support legs 48 are provided on the collecting tray 18.

In order to facilitate packing of the device 10 for transit purposes, the device can be disassembled into the following components: the grill-arrangement 12, the fuel burner 34, the collecting tray 18 and the support legs 48.

Referring to FIG. 4, channels 50 are provided below the heating zones, the channels being adapted to receive burners 34 in the form of troughs 52 for containing non-combustible packing capable of containing a volatile liquid fuel. The packing may, for example, be asbestos fibres, and fuel such as methylated spirits may be used. The device 10 shown in FIG. 4 is furthermore provided with a removable collecting tray 54 and may also be provided with detachable support legs (not shown).

The rods may, for example, be of aluminium.

In use, fuel is supplied to the burners, is ignited at the burners, to supply heat to the heating zones, and meat, fish, or the like foodstuff is cooked by locating it in contact with and between the upper and lower grill members 14 and 16 respectively intermediate the heating zones in the region 56. Heat supplied at the heating zones is available at the region 56 by conducting along the rods 20 and 22.

I claim:

1. A device for cooking meat, fish or like foodstuff, comprising:
    a horizontal grill arrangement having upper and lower heat conductive grill members for receiving foodstuff to be cooked between them, the grill arrangement having a central portion defining a cooking zone for receiving foodstuff to be cooked, and having marginal portions defining heating zones,
    gas burner means in the heating zones for directly heating only the marginal portions of the grill arrangement defining the heating zones, and
    a collecting tray below the cooking zone for collecting liquids dripping from foodstuff in the cooking zone during use.

2. A device according to claim 1, in which each grill member comprises a plurality of substantially parallel heat conductive rods having their free end portions defining the heating zones on opposed sides of the cooking zone.

3. A device according to claim 2, in which the free end portions of the conductive rods of the upper and lower grill members are substantially equally spaced from the gas burner means in each heating zone during use, to effect substantially equal heat transfer by conduction from the free end portions to the cooking zone in the upper and lower grill members.

4. A device according to claim 1, wherein each grill member has frame means disposed between the central portion and the marginal portions of the grill arrangement to separate the marginal portions from the central portion.

5. A device according to claim 4 in which the grill-arrangement is of substantially rectangular form and in which the upper grill member is hingedly attached or attachable to the lower grill member about a pivotal axis along one edge of the grill members, the heating zones extending along the opposed edges of the grill members substantially at right angles to the pivotal axis.

* * * * *